United States Patent
Wang

(10) Patent No.: US 8,681,858 B2
(45) Date of Patent: Mar. 25, 2014

(54) RATE CONTROL FOR TWO-PASS ENCODER

(75) Inventor: Limin Wang, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 773 days.

(21) Appl. No.: 12/645,676

(22) Filed: Dec. 23, 2009

(65) Prior Publication Data
US 2011/0150094 A1    Jun. 23, 2011

(51) Int. Cl.
*H04N 7/28* (2006.01)
*H04N 7/30* (2006.01)

(52) U.S. Cl.
USPC ............. 375/240.05; 375/240.03; 375/240.07

(58) Field of Classification Search
USPC ............................ 375/240.05, 240.03, 240.07
See application file for complete search history.

(56) References Cited

U.S. PATENT DOCUMENTS

| | | | | |
|---|---|---|---|---|
| 5,583,573 | A * | 12/1996 | Asamura et al. ......... | 375/240.04 |
| 5,686,962 | A * | 11/1997 | Chung et al. ............. | 375/240.16 |
| 5,719,986 | A   | 2/1998  | Kato et al. | |
| 5,854,658 | A * | 12/1998 | Uz et al. .................... | 375/240.05 |
| 5,933,532 | A   | 8/1999  | Mihara | |
| 5,978,029 | A * | 11/1999 | Boice et al. .............. | 375/240.14 |
| 6,067,118 | A * | 5/2000  | Chen et al. ............... | 375/240.03 |
| 6,181,742 | B1  | 1/2001  | Rajagopalan et al. | |
| 7,092,442 | B2* | 8/2006  | Zhang et al. ............. | 375/240.05 |
| 7,095,784 | B2  | 8/2006  | Chang et al. | |
| 7,302,002 | B2* | 11/2007 | Yagasaki et al. ......... | 375/240.12 |
| 7,373,004 | B2  | 5/2008  | Chang et al. | |
| 8,107,537 | B2* | 1/2012  | Zhou et al. ............... | 375/240.25 |
| 8,135,063 | B2* | 3/2012  | Kwon et al. ............. | 375/240.03 |
| 2002/0044603 | A1* | 4/2002  | Rajagopalan et al. ... | 375/240.03 |
| 2002/0114393 | A1* | 8/2002  | Vleeschouwer ......... | 375/240.16 |
| 2002/0131492 | A1* | 9/2002  | Yokoyama ............... | 375/240.03 |
| 2002/0131494 | A1* | 9/2002  | Fukuda et al. ........... | 375/240.03 |
| 2004/0120398 | A1* | 6/2004  | Zhang et al. ............. | 375/240.03 |
| 2005/0226321 | A1* | 10/2005 | Chen ........................ | 375/240.03 |
| 2006/0165168 | A1* | 7/2006  | Boyce et al. ............. | 375/240.12 |
| 2007/0064793 | A1* | 3/2007  | Wang et al. .............. | 375/240.03 |
| 2008/0212677 | A1* | 9/2008  | Chen et al. ............... | 375/240.16 |
| 2008/0225945 | A1* | 9/2008  | Wu et al. .................. | 375/240.03 |
| 2010/0232498 | A1* | 9/2010  | Liu et al. .................. | 375/240.03 |
| 2011/0150076 | A1* | 6/2011  | Wang et al. .............. | 375/240.03 |

OTHER PUBLICATIONS

P. Yin, H.Y.C. Tourapis, A.M. Tourapis, & J. Boyce, "Fast Mode Decision and Motion Estimation for JVT/H.264", Proc. of 2003 Int'l Conf. on Image Processing 2003 (Sep. 2003).*
D. Zhang, K.N. Ngan, & Z. Chen, "A two-pass rate control algorithm for H.264/AVC high definition video coding", 24 Signal Processing: Image Communication 357-367 (May 2009).*

* cited by examiner

*Primary Examiner* — David Czekaj
*Assistant Examiner* — David N Werner
(74) *Attorney, Agent, or Firm* — Thomas A. Ward

(57) ABSTRACT

Rate control is provided in a two-pass encoder. A first encoding pass is performed to encode an input video sequence. Coding statistics for the first encoding pass are collected. Target coding parameters for a second encoding pass are calculated based on the coding statistics for the first encoding pass. The second encoding pass is performed to encode the input video sequence at a constant bit rate (CBR) using the target coding parameters to form a second pass encoded stream.

16 Claims, 7 Drawing Sheets

RATE CONTROL FOR TWO-PASS ENCODER

BACKGROUND

ITU-T H.264/MPEG-4 part 10 is a recent international video coding standard, developed by Joint Video Team (JVT) formed from experts of International Telecommunications Union Telecommunication Standardization Sector (ITU-T) Video Coding Experts Group (VCEG) and International Organization for Standardization (ISO) Moving Picture Experts Group (MPEG). ITU-T H.264/MPEG-4 part 10 is also referred to as MPEG-4 AVC (Advanced Video Coding). MPEG-4 AVC achieves data compression by utilizing the advanced coding tools, such as spatial and temporal prediction, blocks of variable sizes, multiple references, integer transform blended with quantization operation, entropy coding, etc. MPEG-4 AVC supports adaptive frame and field coding at picture level. MPEG-4 AVC is able to encode pictures at lower bit rates than older standards but maintain at least the same quality of the picture.

Rate control is an engine that dynamically adjusts encoding parameters so that the resulting compressed bit rate can meet a target bit rate. Rate control is important to regulate the encoded bit stream to satisfy the channel condition and to enhance the reconstructed video quality. However, in actuality, single-pass rate control for an MPEG-4 AVC often results in uneven quality within a picture as well as from picture to picture. For example, there may be serious pulsing problems around instantaneous decoding refresh (IDR) picture of MPEG-4 AVC with single-pass rate control. Many of the causes of the uneven quality result from the inability to accurately estimate a target bit rate for future pictures that have yet to be encoded in the stream.

SUMMARY

Disclosed herein is a method for providing rate control in a two-pass encoder, according to an embodiment. In the method, a first encoding pass is performed. Coding statistics generated from the first encoding pass are then collected for a second encoding pass. Target coding parameters for the second encoding pass are calculated based on the coding statistics for the first encoding pass. The second encoding pass is performed at constant bit rate (CBR).

Also disclosed herein is a two-pass encoder, according to an embodiment. The two-pass encoder includes a first encoding module, a rate control module and a second encoding module. The first encoding module includes a circuit configured to perform a first encoding pass to encode input video sequences. The first encoding module is also configured to collect coding statistics generated from the first encoding pass. The rate control module is configured to calculate target coding parameters for a second encoding pass based on coding statistics from the first encoding pass. The second encoding module is configured to encode the input video sequences using the target coding parameters for the second encoding pass and to output a final encoded stream.

Further disclosed is a computer readable storage medium on which is embedded one or more computer programs implementing the above-disclosed method for providing rate control in a two-pass encoder, according to an embodiment.

As described above, the embodiments utilize a two-pass encoder, and rate control is improved by utilizing the coding statistics of pictures encoded in the first encoding pass to determine the target bit rate for encoding the pictures in the second encoding pass. Because coding statistics are known from the first encoding pass, these coding statistics are leveraged to accurately estimate the target bit rate for the second encoding pass, and as a result, to better distribute an available bits budget over pictures and therefore improve quality of the reconstructed pictures on the decoding end.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

1. Functional Diagram of Two-Pass Encoder

Figure 1:
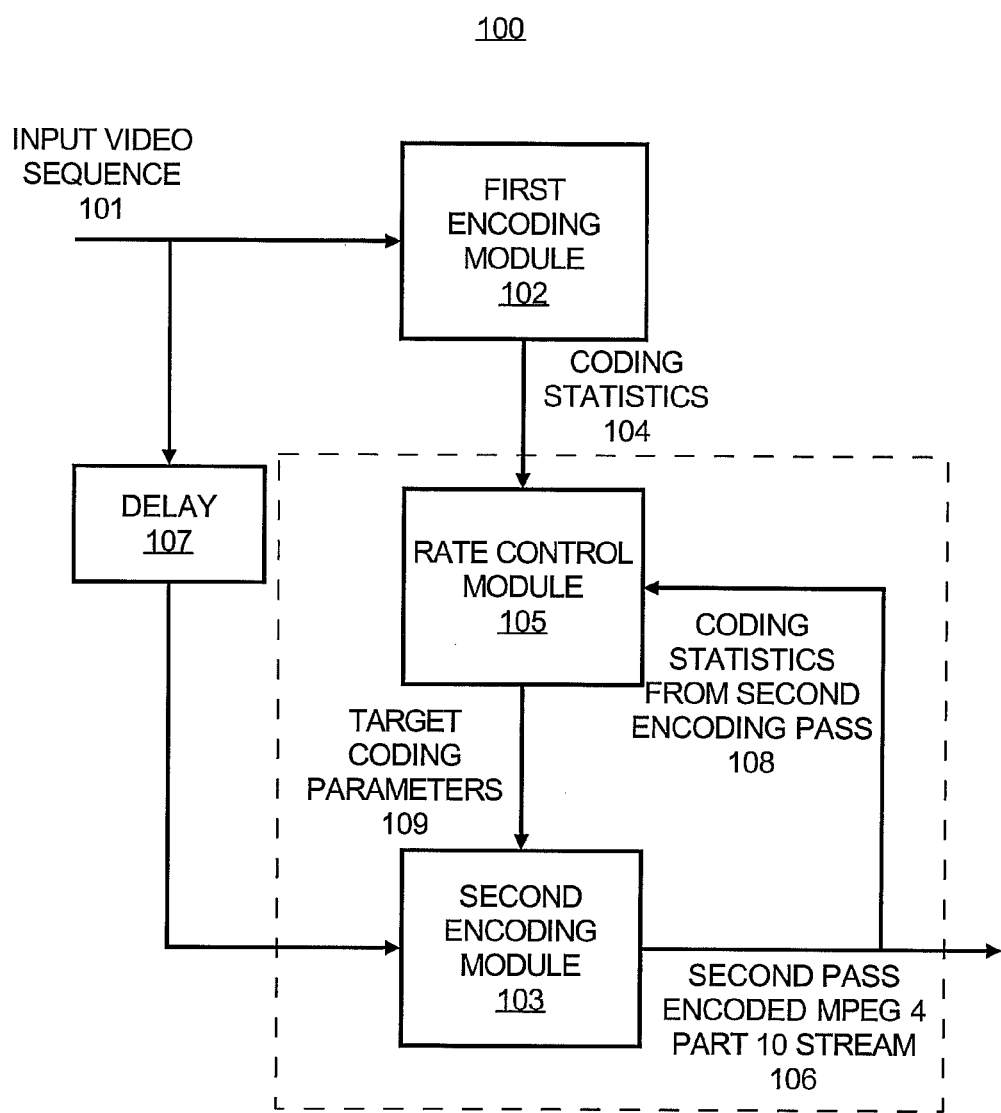
FIG. 1 illustrates a functional block diagram of a two pass encoder, according to an embodiment.

FIG. 1 illustrates a functional block diagram of a two-pass MPEG-4 AVC encoder 100 configured to encode an input video sequence 101. The input video sequence includes a sequence of pictures in which each picture i is one of an I, P, $B_s$, or B picture in field or frame. As shown in FIG. 1, a first encoding module 102 and a second encoding module 103 receive the same input video sequence 101 with a delay 107 between a first encoding pass at the first encoding module 102 and the second encoding pass at the second encoding module 103. The first encoding pass is performed at either variable bit rate (VBR) or constant bit rate (CBR). The first encoding module 102 outputs coding statistics 104 to a rate control module 105. The rate control module 105 outputs target coding parameters 109 to the second encoding module 103. The second encoding module 103 is configured to use the target coding parameters 109 to encode the input video sequence 101 in the second encoding pass and to thereby output a second pass encoded MPEG-4 AVC stream 106.

The two-pass MPEG-4 AVC encoder 100 includes a hardware, such as a processor or other circuit for encoding. It should be understood that the two-pass MPEG-4 AVC encoder 100 depicted in FIG. 1 may include additional components and that some of the components described herein may be removed and/or modified without departing from a scope of the two-pass MPEG-4 AVC encoder 100. Although the two-pass MPEG-4 AVC encoder 100 is described with respect to MPEG-4 AVC, it should be apparent that embodiments of the invention may be used with different video coding standards.

According to an embodiment, the first encoding module 102 and the second encoding module 103 are configured as partial encoders. In the two-pass MPEG-4 AVC encoder 100, ME, which is the most time consuming task in an MPEG-4 AVC encoder, and code mode selection are not duplicated in the first encoding module 102 and the second encoding module 103. Instead, tasks are shared by the first encoding module 102 and the second encoding module 103. For instance, the first encoding module 102 may perform ME at full-pel resolution to form full-pel motion vectors (MVs) with associated reference indexes (refIdx) and eliminate a large number of possible code modes per MB to form a limited number of candidate code modes. The second encoding module 103 may thereafter refine the full-pel MVs at quarter-pel resolution and select a final code mode from among the limited number of candidate code modes.

The first encoding pass and the second encoding pass are performed approximately in parallel with an offset provided by the delay 107. The coding statistics 104 from the first encoding pass may thereby be used in the second encoding pass as described hereinbelow with respect to the methods 200-230 described in FIGS. 2-5. The first encoding pass is ahead of the second encoding pass by an approximately constant number of pictures, for example, the delay 107 may be 30 pictures. The delay 107 may also be measured in time, for instance 1 second. Because the first encoding pass is ahead of the second encoding pass, the first encoding pass may provide the coding statistics 104 for the second encoding pass before the second encoding module 103 starts to process the pictures. This includes sending the coding statistics from the first encoding pass to the rate control module 105 of the second encoding module 103 to be used in the second encoding pass to generate target coding parameters 109 which are thereafter used in the second encoding pass.

The rate control module 105 receives the coding statistics 104 from the first encoding module 102. The coding statistics 104 include, for instance, quantization parameters (QPs), and a number of bits generated for each picture in the first encoding pass. The rate control module 105 is configured to generate the target coding parameters 109 using the coding statistics 104, as will be described hereinbelow with respect to FIGS. 2 to 5 and the methods 200 to 230. The target coding parameters 109 include, for instance, a target number of bits for each picture in the second encoding pass, a target number of bits budgeted for a GoP in the second encoding pass, and QP(s). The rate control module 105 then sends the target coding parameters 109 to the second encoding module 103.

The second encoding module 103 encodes the input video sequence 101 using the target coding parameters 109 and coding information, such as MVs and associated refIdx and candidate code modes per MB, from the first encoding pass 104. The second encoding module 103 then outputs a second pass encoded MPEG-4 AVC stream 106. The second encoding module 103 also provides updated coding statistics from the second encoding pass to the rate control module 105 in a feedback loop as will be described in detail hereinbelow with respect to FIG. 3-4 and the methods 210 and 220.

2. Rate Control in the Two-Pass MPEG-4 AVC Encoder

Examples of methods in which the two-pass MPEG-4 AVC encoder 100 may be employed to encode an input video sequence 101 using rate control are now described with respect to the following flow diagrams of the methods 200-230 depicted in FIGS. 2-5. It should be apparent to those of ordinary skill in the art that the methods 200-230 represents a generalized illustration and that other steps may be added or existing steps may be removed, modified or rearranged without departing from the scopes of the methods 200-230. In addition, the methods 200-230 are described with respect to the two-pass MPEG-4 AVC encoder 100 by way of example and not limitation, and the methods 200-230 may be used in other systems. Also, the methods and system described herein are described with respect to encoding video sequences using MPEG-4 AVC by way of example. The methods and systems may be used to encode video sequences using other types of MPEG standards or standards that are not MPEG.

Some or all of the operations set forth in the methods 200-230 may be contained as one or more computer programs stored in any desired computer readable medium and executed by a processor on a computer system. Exemplary computer readable media that may be used to store software operable to implement the present invention include but are not limited to conventional computer system RAM, ROM, EPROM, EEPROM, hard disks, or other data storage devices.

Figure 2:
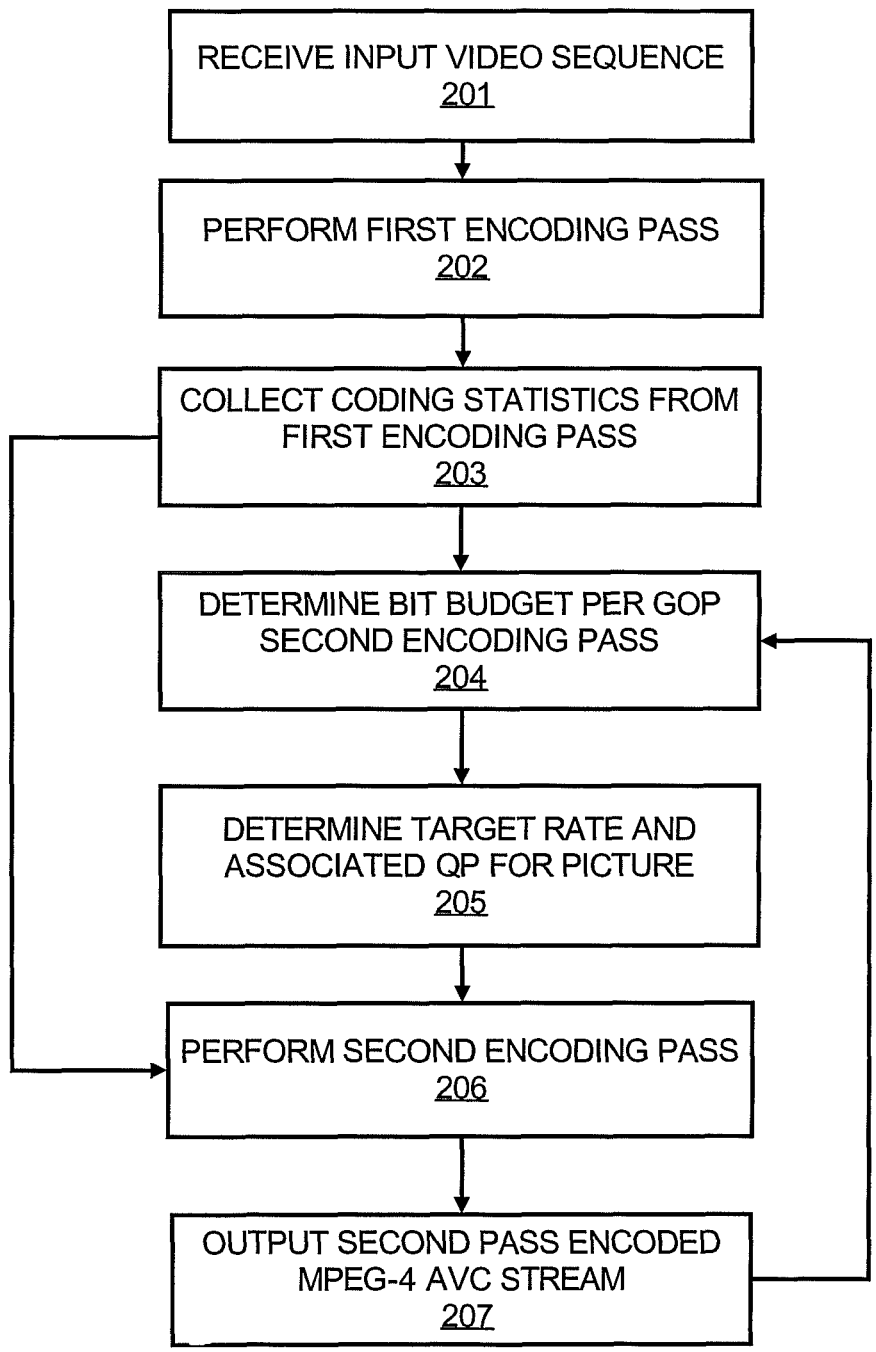
FIG. 2 illustrates a flow diagram of providing rate control in a two-pass encoder, according to an embodiment.

The method 200, as shown in FIG. 2, is a generalized illustration of a method of providing rate control in the two-pass MPEG-4 AVC encoder 100.

At step 201, as shown in FIG. 2, the two-pass MPEG-4 AVC encoder 100 receives input video sequence 101 at the first encoding module 102.

At step 202, the first encoding module 102 performs the first encoding pass. The first encoding module 102 may perform the first encoding pass at a variable bit rate (VBR) for uniform quality within a picture as well as from picture to picture. The first encoding module 102 may only perform full-pel ME. The first encoding module 102 may select a limited number of candidate code modes per MB using non-RD cost function.

The first encoding module 102 may apply a fixed QP to all the MBs per each picture in the first encoding pass, wherein each picture is an I, P, $B_s$, or B picture coded in field or frame. The fixed QP may be further modulated per MB by the MB's local activity. The use of the fixed QP results in a smooth quality within a picture and a stable quality along the time domain. The number of bits generated per picture, however, may vary from picture to picture depending upon the picture complexity and scene content.

At step 203, the first encoding module 102 collects coding statistics 104 from the first encoding pass. Collecting the coding statistics may include determining the coding statistics or calculating the coding statistics from the first encoding pass. Steps 202 and 203 of the method 200 may be performed concurrently, in whole or in part. For instance, the first encoding module 102 collects the coding statistics 104 from the first encoding pass, such as the QP value and associated bits per picture, in the process of performing the first encoding pass. The first encoding module 102 thereafter outputs the coding statistics 104 from the first encoding pass to the rate control module 105 of the second encoding module 103 at step 204 and at step 205.

Pictures in an input video sequence received by the two-pass MPEG-4 AVC encoder 100 are often grouped into GoPs. A GoP may contain one I picture or an instantaneous decoding refresh (IDR) picture and a few P pictures. There may be one or more B pictures or Bs pictures between the I/IDR picture and/or P pictures. I, I/IDR, P, B, and Bs are picture types described by the MPEG-4 AVC standard. A group of successive B or Bs pictures plus a following I/IDR or P picture is called a sub_GoP. A GoP is described by a number of pictures per GoP and per sub_GoP, that is, the GoP length is referred to as $N_{GoP}$, and the sub_GoP length is referred to as $N_{sub\_GoP}$.

At step 204, the rate control module 105 determines a target bit budget per GoP for the second encoding pass. Given a target bit rate (i.e. bit_rate) in bits per second and a picture rate (i.e., pic_rate) in pictures per second, a GoP of length $N_{GoP}$ (e.g., where length may be in terms of number of pictures i) is budgeted a nominal number of bits $$R_{GOP\_nominal} = N_{GOP} \times \frac{bit\_rate}{pic\_rate}. \qquad \text{Equation (1)}$$

The target bit rate per GoP may be predetermined. Determining the target bit rate may comprise retrieving the target bit rate stored on a memory within the two-pass MPEG-4 AVC encoder 100. Alternately, determining the target bit rate may comprise receiving the target bit rate from an attached input device.

At step 204, the bits budget for a GoP, $R_{GoP\_passTwo}$, is initially set to $R_{GoP\_nominal}$ at the beginning of the second encoding pass. After a picture in the GoP is encoded in the second encoding pass at step 207, updated coding statistics from the second pass encoded MPEG-4 AVC stream, such as an actual number of bits consumed for each encoded picture, are input to the rate control module 105. The rate control module 105 then updates the bits budget, $R_{GoP\_passTwo}$, using a remaining bits method or alternately a sliding windows method that will be described in detail hereinbelow with respect to FIG. 3-4 and the methods 210 and 220

At step 205, the rate control module 105 calculates target coding parameters 109 for the second encoding pass including a target rate per picture and associated QP. The bits budget for the GoP, determined/updated at step 204, is allocated to each picture in the GoP by the rate control module 105.

If $R_{GoP\_passOne}$ is a total number of bits consumed for all the pictures within the same GoP in the first encoding pass, and $R_{one,Ff,picType}(i)$ is the number of bits used for each picture i within the GoP in the first encoding pass, then $$R_{GOP\_passOne} = \sum_{i \in \{GOP\}} R_{one,Ff,picType}(i). \qquad \text{Equation (2)}$$

If picture i, which may be an I, P, B, or Bs picture that is coded in frame or field, is assigned a target number of bits in the second encoding pass, defined as $R_{two,Ff,picType}(i)$ the sum of the assigned target bits of all the pictures within the GoP is equal to the number of bits budgeted for the GoP, that is, $$R_{GOP\_passTwo} = \sum_{i \in \{GOP\}} R_{two,Ff,picType}(i). \qquad \text{Equation (3)}$$

To achieve a relatively smooth quality per picture and a relatively small quality variation along the time domain in the second encoding pass, similar to the first encoding pass, a ratio of $R_{two,Ff,picType}(i)$ over $R_{GoP\_passTwo}$ in the second encoding pass is targeted to be the same as a ratio of $R_{one,Ff,picType}(i)$ over $R_{GoP\_passOne}$ within the same GoP. A target number of bits for picture i in the second encoding pass is therefore determined as $$R_{two,Ff,picType}(i) = R_{one,Ff,picType}(i) \times \frac{R_{GOP\_passTwo}}{R_{GOP\_passOne}} \qquad \text{Equation (4)}$$

A QP for picture i is thereafter determined using the target rate for picture i, for instance, as will be described in detail hereinbelow with respect to FIG. 5 and the method 230.

At step 206, the second encoding module 103 receives the target coding parameters 109 and performs the second encoding pass. The second encoding module 103 uses the target coding parameters 109 received from the rate control module 105 as well as the coding information, such as full-pel MVs and associated refIdx, from the first encoding module 102. For example, the fixed QP that is calculated per picture is used for quantization in the second encoding pass so the target bit rate per picture is met. Also, the second encoding module 103 performs motion estimation at the quarter-per resolution and selects the final code mode per coding stage for the second pass. At step 207, the second encoding module 103 outputs a second pass encoded MPEG-4 AVC stream 106.

Figure 3:
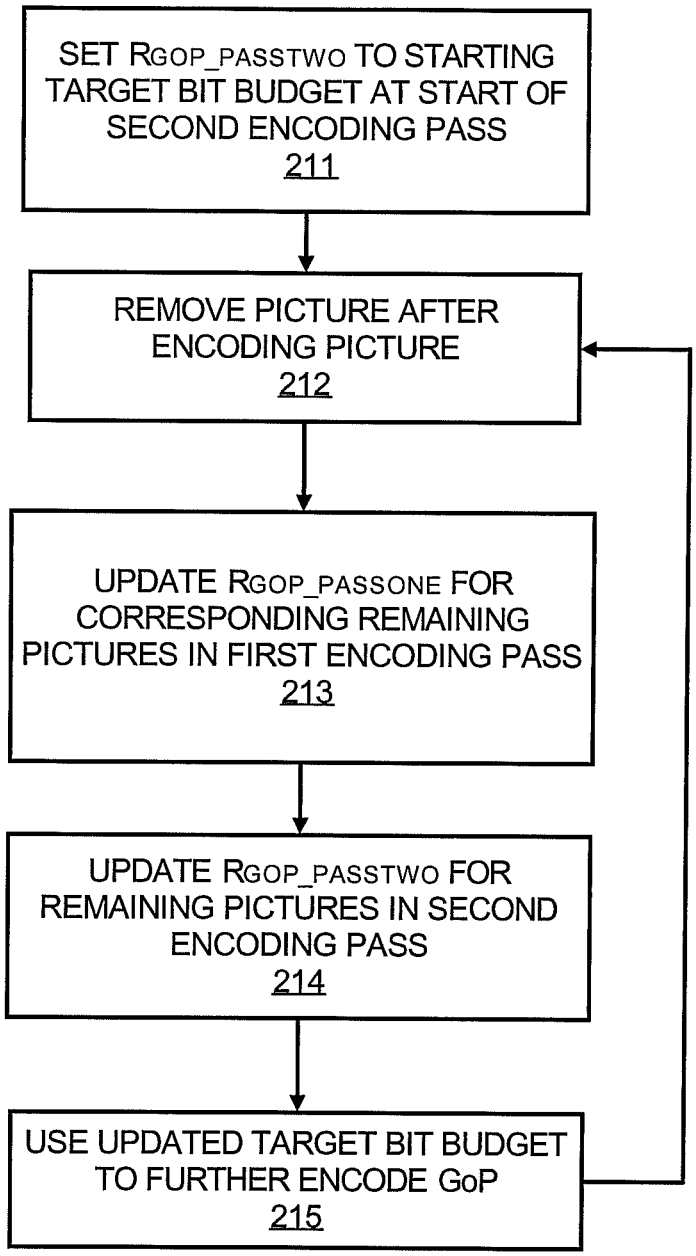
FIG. 3 illustrates a flow diagram of providing rate control in a two-pass encoder, according to an embodiment.

3. Updating Bit Budget Per GOP Using Remaining Bits Method or Sliding Windows Method The method 210, as shown in FIG. 3, is a generalized illustration of a method of updating the target bit budget per GOP in the two-pass MPEG-4 AVC encoder 100. In the remaining bits method, the GoP length is a variable, starting with $N_{GoP}$ per new GoP and decreasing by one after encoding each picture. $N_{GoP}$ is a predetermined number of pictures. $R_{GOP\_passTwo}$ and $R_{GOP\_passOne}$ are respectively bits budgeted for remaining pictures within a GoP that is currently being encoded by the second encoding module 102 in the second encoding pass and bits consumed for corresponding remaining pictures within the same GoP by the first encoding pass, respectively. After all the pictures in the GoP have been encoded, the second encoding module 102 may begin encoding a new GoP.

At step 211, as shown in FIG. 3, as the second encoding module 103 begins encoding a current GoP, the second encoding module 103 sets $R_{GOP\_passTwo}$ to a starting target bit budget for the GoP. The target bit budget may be defined by an equation $$R_{GOP\_passTwo} = R_{GOP\_passTwo} + R_{GOP\_no\,min\,al}, \qquad \text{Equation (5)}$$

in which $R_{GOP\_passTwo}$ on the left of equation is the target bit budget at the start of encoding a new GoP, and $R_{GOP\_passTwo}$ passTwo on the right of equation is the number of the leftover bits from encoding a previous GoP. If the GoP is at the beginning of the second encoding pass, $R_{GOP\_passTwo}$ passTwo on the right of equation is set to a zero value as there are no left over bits from encoding a previous GoP. The starting targets bits budget in that instance is equal to $R_{GOP\_no\,min\,al}$.

At step 212, after the second encoding module 103 encodes a picture in the second encoding pass the picture is removed and at step 213 $R_{GOP\_passOne}$ is updated in the rate control module 105. $R_{GOP\_passOne}$ is used, for example, in calculating $R_{two,Ff,picType}(i)$, as is shown previously hereinabove at step 205 of the method 200. The rate control module 105 collects the coding statistics from the first encoding module and updates $R_{GOP\_passOne}$ by summing the bits for the corresponding remaining pictures within the same current GoP in the first encoding pass. The bits used for the corresponding remaining pictures in the first encoding pass is calculated by an equation $$R_{GOP\_passOne} = \sum_{i \in \{GOP\}} R_{one,Ff,picType}(i). \qquad \text{Equation (6)}$$

in which $$\sum_{i \in \{GOP\}} R_{one,Ff,picType}(i)$$

is the sum of the number of bits for the corresponding remaining pictures within the same current GoP in the first encoding pass. Because the first encoding pass has completed encoding of the remaining pictures, $$\sum_{i \in \{GOP\}} R_{one,Ff,picType}(i)$$

is therefore available.

At step 214, after the second encoding module 103 encodes a picture in the second encoding pass, $R_{GOP\_passTwo}$ is updated in the rate control module 105. The updated target bit budget is defined by an equation $$R_{GOP\_passTwo} = R_{GOP\_passTwo} - R_{Ff,picType}(i), \quad \text{Equation (7)}$$

in which $R_{GOP\_passTwo}$ on the right of equation is the target bit budget before the second encoding module 103 encodes the picture in the second encoding pass and $R_{GOP\_passTwo}$ on the left of equation is the updated target bit budget after the picture is encoded. The updated $R_{GOP\_passTwo}$ equals the $R_{GOP\_passTwo}$ value before encoding a picture minus the actual number of bits used to encode the picture.

At step 215, the updated bit budget per GoP is used to further encode the GoP. The second encoding module 103 and the rate control module 105 use a feedback loop in order to achieve the target bit rate in the second encoding pass. The target bit budget per GoP is updated with each picture encoded in the second pass. The second encoding module 103 outputs the second pass encoded MPEG-4 AVC stream 106.

Figure 4:
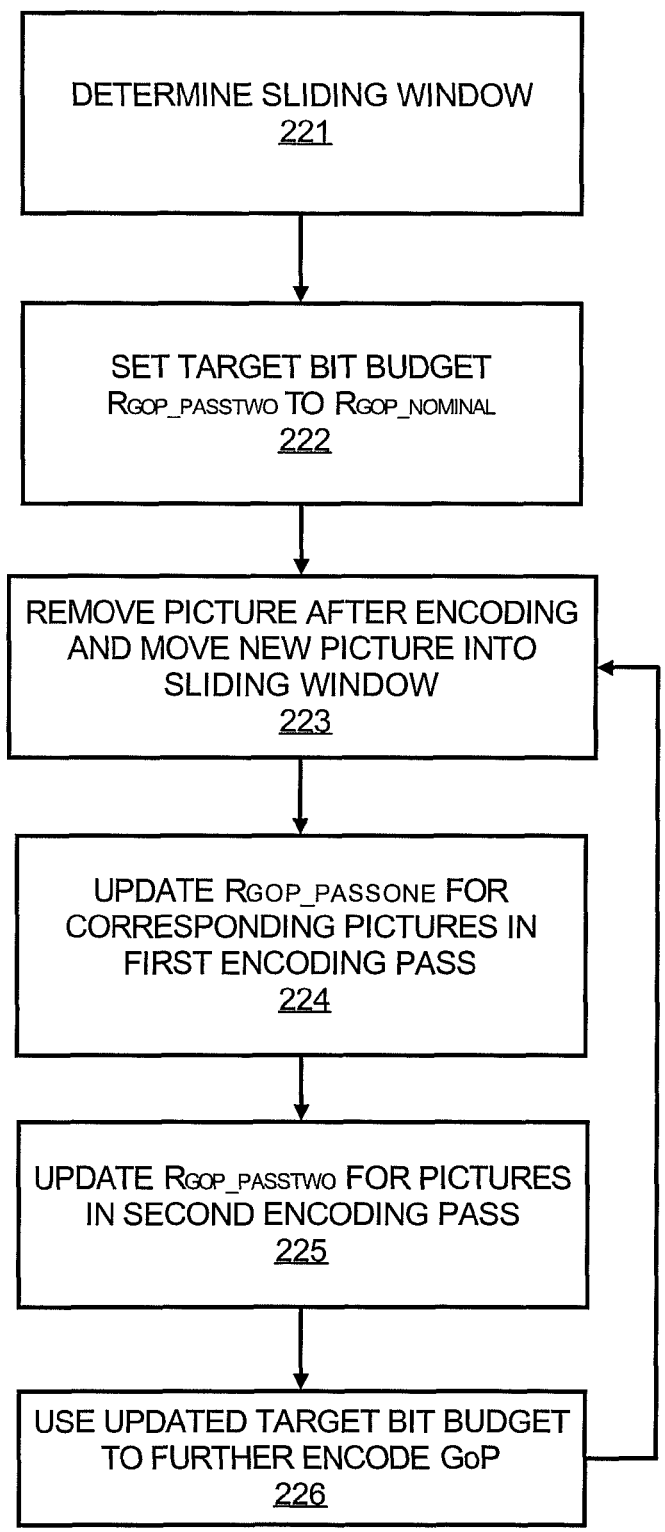
FIG. 4 illustrates a flow diagram of providing rate control in a two-pass encoder, according to an embodiment.

The method 220, as shown in FIG. 4, is a generalized illustration of a method of updating the bit budget per GoP in the two-pass MPEG-4 AVC encoder 100. In the sliding window approach, the current GOP length is set to $N_{GoP}$. A sliding window is slid along the time domain. After a picture is coded, the coded picture is moved out the sliding window, and a new picture is moved in the sliding window.

At step 221, as shown in FIG. 4, the two-pass MPEG-4 AVC encoder 100 determines the sliding window along a time domain. For instance, the sliding window may be set to $N_{GoP}$, a length of a GoP. The total bits consumed for a current GoP in the first encoding pass may be calculated by using Equation (6) as shown hereinabove at step 212 of the method 210.

At step 222, the rate control module 105 sets the target bit budget for the current GoP in the second encoding pass. If $i < N_{GoP} - 1$, for instance at a beginning of a sequence, some of pictures $R_{two,Ff,picType}(i)$ may not be presently available. $R_{GOP\_passTwo}$ may therefore be set as Equation (9)

$$R_{GOP\_passTwo} = R_{GOP\_nominal} \quad \text{Equation (9)}$$

At step 223, the rate control module 105 removes a picture after the picture is encoded in the second encoding pass. The rate control module 105 also moves a new picture into the sliding window.

As the sliding window is sliding along the time domain, the rate control module 105 updates $R_{GOP\_passOne}$ at step 224 for pictures in the first encoding pass and $R_{GOP\_passTwo}$ at step 225 for pictures in the second encoding pass. According to an embodiment, the targets bits budget $R_{GOP\_passTwo}$ is updated by an equation $$R_{GOP\_passTwo} = R_{GOP\_nominal} - (\overline{R}_{GOP\_passTwo} - R_{GOP\_passTwo}) \quad \text{Equation (8)}$$

in which $R_{GOP\_passTwo}$ on the left of equation is the bits budgeted for a current GoP, $R_{GOP\_passTwo}$ on the right of equation is the bits budgeted for a previous GoP before the updating time instant, and $\overline{R}_{GOP\_passTwo}$ is the actual number of bits consumed for the pervious GoP.

Additionally, at an end of a sequence, as the sliding window slides out the sequence, some of $$\sum_{i \in \{GOP\}} R_{one,Ff,picType}(i)$$

may become unavailable. In that instance, $R_{GOP\_passOne}$ may maintain a last value before the sliding window slides out.

At step 226, the updated bit budget per GoP is used to further encode the GoP. The second encoding module 103 and the rate control module 105 use a feedback loop in order to achieve the target bit rate in the second encoding pass. The target bit budget per GoP is updated in the second encoding pass. The second encoding module 103 outputs the second pass encoded MPEG-4 AVC stream 106.

4. Determining QP in the Two-Pass MPEG-4 AVC Encoder

Figure 5:
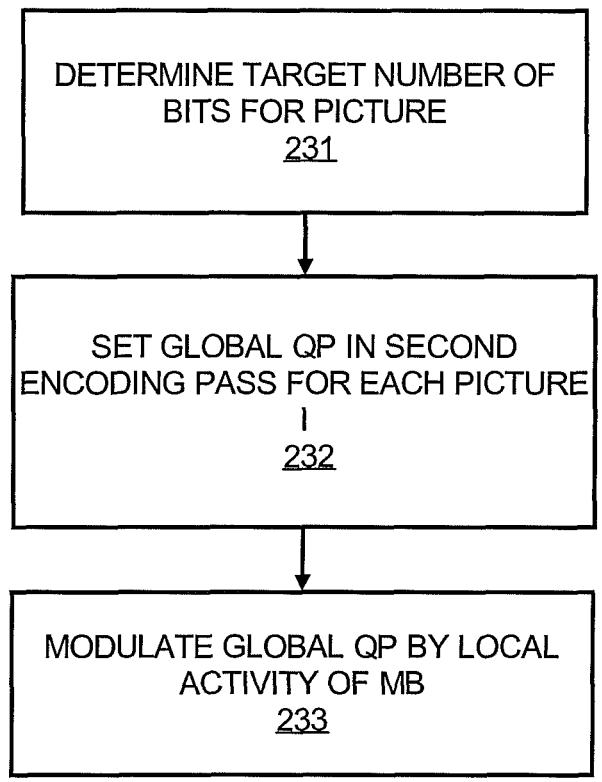
FIG. 5 illustrates a flow diagram of providing rate control in a two-pass encoder, according to an embodiment.

The method 230, as shown in FIG. 5, is a generalized illustration of a method of determining a QP in the second encoding pass of the two-pass MPEG-4 AVC encoder 100. The method 230 may be applied at step 205 of the method 200.

At step 231, the target number of bits for each picture i, $R_{two,Ff,picType}(i)$, determined for instance using the methods 200 to 220 hereinabove, is determined at the rate control module 105.

At step 232, the rate control module 105 may determine a global QP for picture i. According to an embodiment, the rate control module 105 assumes a complexity measure model of a picture using an equation as $$C = R \times 2^{\frac{Q-c}{6}}, \quad \text{Equation (10)}$$

in which Q is the QP value applied to the picture, R is the corresponding bits generated, and c is a constant that takes one of six values, depending upon the QP value. Because picture complexity is an inherent characteristic of a picture, a picture complexity in the first encoding pass and a picture complexity in the second encoding pass is approximately the same, as determined using the following equations, $$R_{two,Ff,picType}(i) \times 2^{\frac{Q_{two}(i)-c}{6}} = R_{one,Ff,picType}(i) \times 2^{\frac{Q_{one}(i)-c}{6}} \quad \text{Equation (11)}$$

or alternately $$Q_{two,Ff,picType}(i) = \quad \text{Equation (12)}$$
$$Q_{one,Ff,picType}(i) + 6 \times \log_2\left(\frac{R_{one,Ff,picType}(i)}{R_{two,Ff,picType}(i)}\right)$$

The equation above gives a global (or average) QP for picture i of picType∈{I, P, $B_s$, B} in Ff∈{frame, field}, with which the number of bits generated for the picture may be determined to approximate a given target number of bits for the picture, $R_{two,Ff,picType}(i)$.

Alternately, according to an embodiment, the rate control module 105 may adjust the QP value per MB based upon a virtual buffer fullness at each MB for each picture i in the second encoding pass so the actual number of bits consumed for picture i is approximately equal to $R_{two,Ff,picType}(i)$. For instance, the QP may be adjusted inside the second encoding modules at step 103 of the method 100.

At step 233, the rate control module 105 may further modulate the $Q_{two,Ff,picType}(i)$ determined above for picture i of picType∈{I, P, $B_s$, B} in Ff∈{frame, field} for each individual MB using the MB's local activity.

According to an embodiment, the first encoding module 102 applies a set of fixed QP value(s) to all pictures in a GOP. The QP values for I, P and B may not be the same. For example, the QP value for B may be slight larger as B is never used as reference and it can tolerate more coding distortion. Fixed QP value(s) in general results in a smooth picture quality within picture as well as from picture to picture, but the bits per picture may vary from picture to picture. For example, an average bits per picture within a GOP in the first encoding module 102 may be smaller than a desired average bits per picture. The total bits for the GOP in pass-one encoder, $R_{GOP\_passOne}$, is therefore smaller than a desired total bits for the GOP in pass-two encoder, $R_{GOP\_passTwo}$. The second encoding module 103 needs to increase the total bits for the GOP, $$\sum_{\in\{GOP\}} R_{two,Ff,picType}$$

to approximate $R_{GOP\_passTwo}$, and, simultaneously, maintains a similar smooth picture quality or a similar relative bit distribution over the pictures of the GOP as the first encoding pass. Specifically, the second encoding module 103 sets the bits per picture proportional to the bits per picture in the first encoding module 102. A new set of QP values may be determined as at step 232 hereinabove based upon the assumed picture complexity model.

5. Rate Control in the First Encoding Module

The first encoding module 102 may implement a rate control, as an alternative to using a fixed QP. According to an embodiment, the second encoding module 103 will thereafter collect the coding statistics from the first encoding module 102, including an average QP per picture type of picType∈{I, P, $B_s$, B} in Ff∈{frame, field} within a current GOP, $Q_{one,Ff,picType}$, and a total number of bits for all the pictures within the current GOP, $R_{GOP\_passOne}$. The QP for picture i may therefore be determined using an equation $$Q_{two,Ff,picType}(i) = Q_{one,Ff,picType} + 6 \times \log_2\left(\frac{R_{GOP\_passOne}}{R_{GOP\_passTwo}}\right), \quad \text{Equation (13)}$$

with which a global (or average) QP for picture i of picType∈{I, P, $B_s$, B} in Ff∈{frame, field} is determined. A number of bits generated for the current GOP may be thereby determined to approximate a given target number of bits for the current GoP, $R_{GOP\_passTwo}$.

6. Architecture of Encoding Modules in a Two-Pass MPEG-4 AVC Encoder

Figure 6:
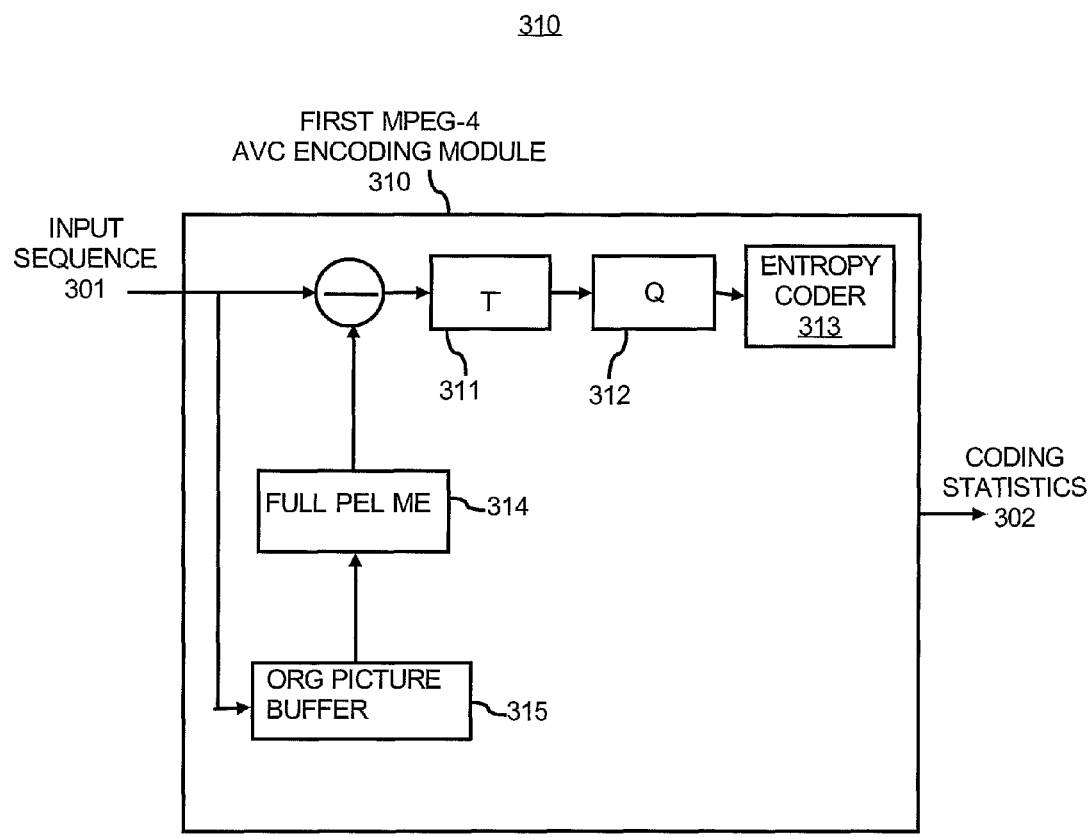
FIG. 6 illustrates a simplified block diagram of a first encoding module, according to an embodiment.
Figure 7:
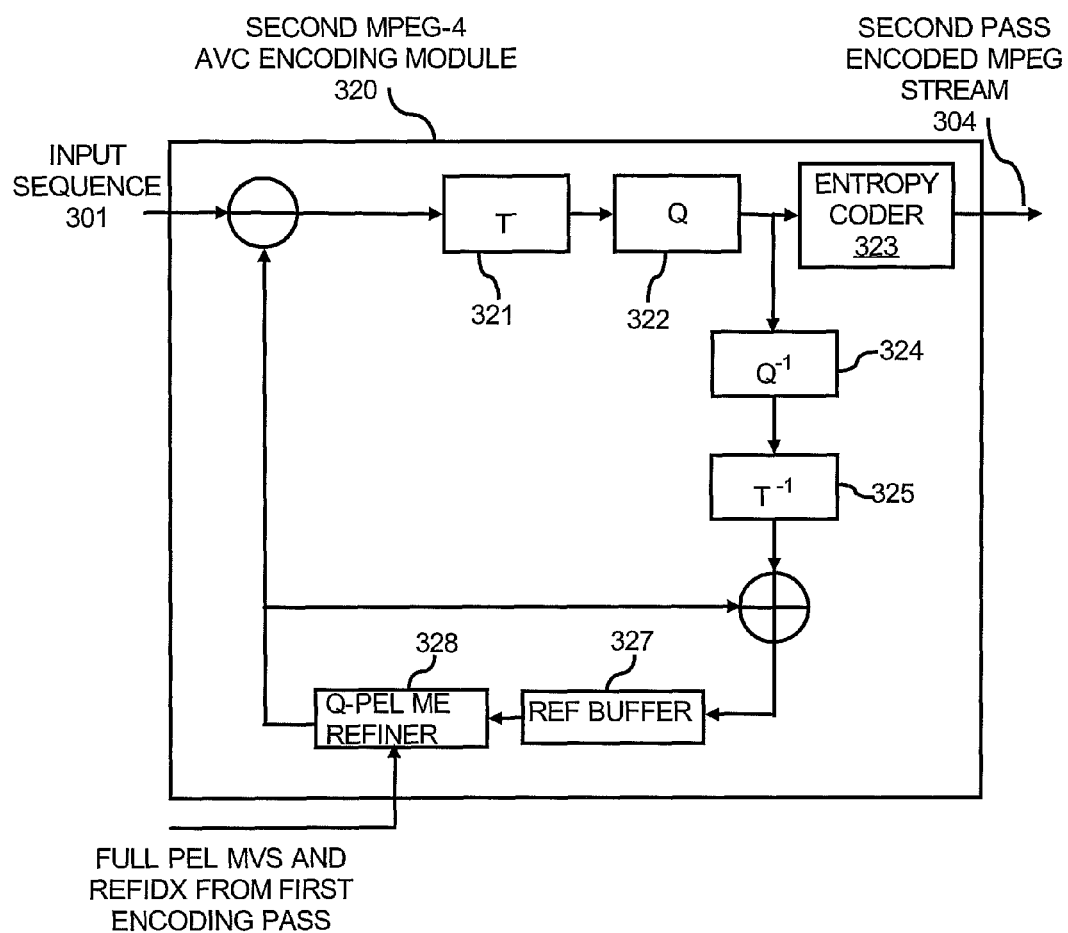
FIG. 7 illustrates a simplified block diagram of a second encoding module, according to an embodiment.

According to an embodiment, FIGS. 6 and 7 illustrate respectively simplified block diagrams of architectures of a first MPEG-4 AVC encoding module 310 and a second MPEG-4 AVC encoding module 320. The first MPEG-4 AVC encoding module 310 and the second MPEG-4 AVC encoding module 320 may be used respectively in a two-pass MPEG-4 AVC encoder, for instance the two-pass MPEG-4 AVC encoder 100, in which the methods 200-230 as described with respect to FIGS. 2 to 5 hereinabove may be implemented. As shown in FIG. 1, the two-pass MPEG-4 AVC encoder 100 may include the first MPEG-4 AVC encoding module 310 and the second MPEG-4 AVC encoding module 320. The two-pass MPEG-4 AVC encoder 100 may be configured to encode an input video sequence 301 using a first encoding pass using the first MPEG-4 AVC encoding module 310. The second MPEG-4 AVC encoding module 320 performs a second encoding pass approximately in parallel with the first encoding pass performed by the first MPEG-4 AVC encoding module 310 with an offset provided by a delay. The second MPEG-4 AVC encoding module 320 encodes the input sequence 301 with a delay and outputs a second pass encoded MPEG stream 304. Coding statistics 302 from the first encoding pass may be used to calculate target coding parameters for the second encoding pass.

Both the first MPEG-4 AVC encoding module 310 and the second MPEG-4 AVC encoding module 320 include a circuit, for instance a processor, a memory, application specific integrated circuit (ASIC) or software code stored on a computer readable storage medium, configured to implement or execute one or more of the processes required to encode an input video sequence to generate an MPEG-4 AVC stream depicted in FIGS. 2-5, according to an embodiment. It should be understood that the first MPEG-4 AVC encoding module 310 and the second MPEG-4 AVC encoding module 320 depicted in FIGS. 6 and 7 may include additional components and that some of the components described herein may be removed and/or modified without departing from a scope of the first MPEG-4 AVC encoding module 310 and the second MPEG-4 AVC encoding module 320.

The first MPEG-4 AVC encoding module 310 and the second MPEG-4 AVC encoding module 320 may comprise MPEG-4 AVC encoders. The first MPEG-4 AVC encoding module 310, and similarly the second MPEG-4 AVC encoding module 320, includes components that may be used to generate an MPEG-4 AVC stream. For instance, the first MPEG-4 AVC encoding module 310 may include a transformer 311, a quantizer 312, an entropy coder 313, a full-pel ME 314, and an original (org) picture buffer 315.

By way of example, as shown in FIG. 6 with respect to the first MPEG-4 AVC encoding module 310, the transformer 311 is a block transform. The block transform is an engine that converts a block of pixels in the spatial domain into a block of coefficients in the transform domain. The block transform tends to remove the spatial correlation among the pixels of a block. The coefficients in the transform domain are thereafter highly decorrelated. The quantizer 312 assigns coefficient values into a finite set of values. Quantization is a lossy operation and the information lost due to quantization cannot be recovered. The entropy coder 313 performs entropy coding, a lossless coding procedure which further removes statistical redundancy in the quantized transform coefficients. The full-pel ME 314 performs full-pel ME which generates MVs and associated reference index per block, and the org pic buffer 315, holds original pictures during the first encoding pass.

By way of example, as shown in FIG. 7, the second MPEG-4 AVC encoding module 320 may include similar components configured to perform similar processes as those used in the first MPEG-4 AVC encoding module 310. In addition, the second MPEG-4 AVC encoding module 320 may include a dequantizer 324 that is configured to perform an inverse quantization operation and an inverse transformer 325. The inverse transformer 325 is configured to perform a reverse transform, for instance from a block of coefficients in the transform domain to a block of pixels in the spatial domain.

As described above, the embodiments utilize a two-pass encoder, and rate control is improved by utilizing the coding statistics of pictures encoded in the first encoding pass to determine the target bit rate for encoding the pictures in the second encoding pass. Because coding statistics are known from the first encoding pass, these coding statistics are leveraged to accurately estimate the target bit rate for the second encoding pass, and as a result, to better distribute an available bits budget over pictures and improve quality of the reconstructed pictures on the decoding end.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention. Also, the methods and system described herein are described with respect to encoding video sequences using MPEG-4 AVC by way of example. The methods and systems may be used to encode video sequences using other types of MPEG standards or standards that are not MPEG.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

What is claimed is:

1. A method of providing rate control in a two-pass encoder, the method comprising:
   receiving an input video sequence, wherein the input video sequence includes a sequence of pictures and each picture i is one of an I, P, $B_s$, or B picture in field or frame;
   performing a first encoding pass to encode the input video sequence;
   collecting coding statistics for the first encoding pass including:
   $R_{one,Ff,picType}(i)$, wherein $R_{one,Ff,picType}(i)$ is a number of bits for each picture i in the first encoding pass,
   $R_{GOP\_passOne}$, wherein $R_{GOP\_passOne}$ is a number of bits for a group of pictures (GoP) in the first encoding pass, and
   $Q_{one,Ff,picType}(i)$, wherein $Q_{one,Ff,picType}(i)$ is an average quantization parameter (QP) for each picture i in the first encoding pass;
   calculating target coding parameters for a second encoding pass based on the coding statistics for the first encoding pass, the target coding parameters including:
   $R_{two,Ff,picType}(i)$, wherein $R_{two,Ff,picType}(i)$ is a target number of bits for each picture i in the second encoding pass,
   $R_{GOP\_passTwo}$, wherein $R_{GOP\_passTwo}$ is a target number of bits budgeted for a GoP in the second encoding pass, and
   a QP for each picture i in the second encoding pass; and
   performing the second encoding pass at a constant bit rate (CBR) on the input video sequence using the target coding parameters to form a second pass encoded stream.

2. The method of claim 1, wherein the QP in the second encoding pass for the picture i is a QP for each macroblock (MB) within the picture i, and the QP for each MB in the second encoding pass is calculated so an actual number of bits consumed for the picture i is approximately equal to $R_{two,Ff,picType}(i)$.

3. The method of claim 1, wherein the QP in the second encoding pass is a global QP for the picture i, and the global QP in the second encoding pass is calculated so an actual number of bits consumed for the picture i is approximately equal to $R_{two,Ff,picType}(i)$.

4. The method of claim 1, further comprising:
   updating the target bit budget for the GOP in the second encoding pass.

5. The method of claim 1, further comprising:
   performing motion estimation (ME) using only full-pel ME to produce full-pel ME results in the first encoding pass; and
   performing higher precision ME around the full pel ME results from the first encoding pass in the second encoding pass.

6. A method of providing rate control in a two-pass encoder, the method comprising:
   receiving an input video sequence, wherein the input video sequence includes a sequence of pictures and each picture i is one of an I, P, $B_s$, or B picture in field or frame;
   performing a first encoding pass to encode the input video sequence;
   collecting coding statistics for the first encoding pass including:
   $R_{one,Ff,picType}(i)$, wherein $R_{one,Ff,picType}(i)$ is a number of bits for each picture i in the first encoding pass,
   $R_{GOP\_passOne}$, wherein $R_{GOP\_passOne}$ is a number of bits for a group of pictures (GoP) in the first encoding pass, and
   $Q_{one,Ff,picType}(i)$, wherein $Q_{one,Ff,picType}(i)$ is an average quantization parameter (QP) for each picture i in the first encoding pass;
   calculating target coding parameters for a second encoding pass based on the coding statistics for the first encoding pass, the target coding parameters including:
   $R_{two,Ff,picType}(i)$, wherein $R_{two,Ff,picType}(i)$ is a target number of bits for each picture i in the second encoding pass, and is calculated as $$R_{two,Ff,picType}(i) = R_{one,Ff,picType}(i) \times \frac{R_{GOP\_passTwo}}{R_{GOP\_passOne}}$$

$R_{GOP\_passTwo}$, wherein $R_{GOP\_passTwo}$ is a target number of bits budgeted for a GoP in the second encoding pass, and
   a QP for each picture i in the second encoding pass; and
   performing the second encoding pass at a constant bit rate (CBR) on the input video sequence using the target coding parameters to form a second pass encoded stream.

7. A method of providing rate control in a two-pass encoder, the method comprising:
   receiving an input video sequence, wherein the input video sequence includes a sequence of pictures and each picture i is one of an I, P, $B_s$, or B picture in field or frame;
   performing a first encoding pass to encode the input video sequence;
   collecting coding statistics for the first encoding pass including:
   $R_{one,Ff,picType}(i)$, wherein $R_{one,Ff,picType}(i)$ is a number of bits for each picture i in the first encoding pass, $R_{GOP\_passOne}$, wherein $R_{GOP\_passOne}$ is a number of bits for a group of pictures (GoP) in the first encoding pass, and $Q_{one,Ff,picType}(i)$, wherein $Q_{one,Ff,picType}(i)$ is an average quantization parameter (QP) for each picture i in the first encoding pass;

calculating target coding parameters for a second encoding pass based on the coding statistics for the first encoding pass, the target coding parameters including:

$R_{two,Ff,picType}(i)$, wherein $R_{two,Ff,picType}(i)$ is a target number of bits for each picture i in the second encoding pass, $R_{GOP\_passTwo}$, wherein $R_{GOP\_passTwo}$ is a target number of bits budgeted for a GoP in the second encoding pass, and a QP for each picture i in the second encoding pass; and performing the second encoding pass at a constant bit rate (CBR) on the input video sequence using the target coding parameters to form a second pass encoded stream, wherein the QP for the picture i in the second encoding pass is calculated as:

$$Q_{two,Ff,picType}(i) = Q_{one,Ff,picType}(i) + 6 \times \log_2\left(\frac{R_{one,Ff,picType}(i)}{R_{two,Ff,picType}(i)}\right).$$

8. A method of providing rate control in a two-pass encoder, the method comprising:

receiving an input video sequence, wherein the input video sequence includes a sequence of pictures and each picture i is one of an I, P, $B_s$, or B picture in field or frame;

performing a first encoding pass to encode the input video sequence;

collecting coding statistics for the first encoding pass including:

$R_{one,Ff,picType}(i)$, wherein $R_{one,Ff,picType}(i)$ is a number of bits for each picture i in the first encoding pass, $R_{GOP\_passOne}$, wherein $R_{GOP\_passOne}$ is a number of bits for a group of pictures (GoP) in the first encoding pass, and $Q_{one,Ff,picType}(i)$, wherein $Q_{one,Ff,picType}(i)$ is an average quantization parameter (QP) for each picture i in the first encoding pass;

calculating target coding parameters for a second encoding pass based on the coding statistics for the first encoding pass, the target coding parameters including:

$R_{two,Ff,picType}(i)$, wherein $R_{two,Ff,picType}(i)$ is a target number of bits for each picture i in the second encoding pass, $R_{GOP\_passTwo}$, wherein $R_{GOP\_passTwo}$ is a target number of bits budgeted for a GoP in the second encoding pass, and a QP for each picture i in the second encoding pass; and performing the second encoding pass at a constant bit rate (CBR) on the input video sequence using the target coding parameters to form a second pass encoded stream updating the target bit budget for the GOP in the second encoding pass, wherein updating the target bit budget for the GOP in the second encoding pass comprises:

determining a number of pictures within the GoP;

as the GoP is starting to be encoded in the second encoding pass, setting $R_{GOP\_passTwo}$ to a nominal value offset by a remaining bits from encoding a previous GoP;

after a picture within the GoP is encoded, removing the picture from the GoP; and as a current picture is being encoded and removed from the current GoP, updating $R_{GOP\_passTwo}$, wherein the updated $R_{GOP\_passTwo}$ equals the $R_{GOP\_passTwo}$ value before encoding the current picture minus the actual number of bits used to encode the current picture.

9. A method of providing rate control in a two-pass encoder, the method comprising:

receiving an input video sequence, wherein the input video sequence includes a sequence of pictures and each picture i is one of an I, P, $B_s$, or B picture in field or frame;

performing a first encoding pass to encode the input video sequence;

collecting coding statistics for the first encoding pass including:

$R_{one,Ff,picType}(i)$, wherein $R_{one,Ff,picType}(i)$ is a number of bits for each picture i in the first encoding pass, $R_{GOP\_passOne}$, wherein $R_{GOP\_passOne}$ is a number of bits for a group of pictures (GoP) in the first encoding pass, and $Q_{one,Ff,picType}(i)$, wherein $Q_{one,Ff,picType}(i)$ is an average quantization parameter (QP) for each picture i in the first encoding pass;

calculating target coding parameters for a second encoding pass based on the coding statistics for the first encoding pass, the target coding parameters including:

$R_{two,Ff,picType}(i)$, wherein $R_{two,Ff,picType}(i)$ is a target number of bits for each picture i in the second encoding pass, $R_{GOP\_passTwo}$, wherein $R_{GOP\_passTwo}$ is a target number of bits budgeted for a GoP in the second encoding pass, and a QP for each picture i in the second encoding pass; and performing the second encoding pass at a constant bit rate (CBR) on the input video sequence using the target coding parameters to form a second pass encoded stream updating the target bit budget for the GOP in the second encoding pass determining a sliding window; and sliding the window along a time domain, wherein the sliding includes in the second encoding pass, setting an initial bit budget for the GoP, $R_{GOP\_passTwo}$, to a nominal value, after a picture is encoded, removing the picture from the sliding window and moving a new picture into the sliding window, and as pictures are being removed from and moved into the sliding window in the second encoding pass, updating $R_{GOP\_passTwo}$, wherein the updated $R_{GOP\_passTwo}$ equals $R_{GOP\_passTwo} = R_{GOP\_no\ min\ al} - (R_{GOP\_passTwo} - R_{GOP\_passTwo})$.

10. A two-pass encoder to encode an input video sequence, the two-pass encoder comprising:

a processor having an input for receiving an input video sequence, and an output for providing an encoded output stream; and a memory storing code that is provided to the processor to cause the processor to perform functions forming a series of modules to process the input video sequence to form the encoded output stream, the modules comprising:

a first encoding module including a circuit configured to perform a first encoding pass to encode the input video sequence, the first encoding module configured to collect coding statistics for the first encoding pass including:

$R_{one,Ff,picType}(i)$, wherein $R_{one,Ff,picType}(i)$ is a number of bits for each picture i in the first encoding pass, wherein i is an element of the set including I, P, $B_s$, and B picture in field or frame, $R_{GOP\_passOne}$, wherein $R_{GOP\_passOne}$ is a number of bits for a GoP in the first encoding pass, and $Q_{one,Ff,picType}(i)$, wherein $Q_{one,Ff,picType}(i)$ is an average QP for each picture i in the first encoding pass;

a rate control module configured to calculate target coding parameters for a second encoding pass based on coding statistics for the first encoding pass, the target coding parameters including:

$R_{two,Ff,picType}(i)$, wherein $R_{two,Ff,picType}(i)$ is a target number of bits for each picture i in the second encoding pass, $R_{GOP\_passTwo}$, wherein $R_{GOP\_passTwo}$ is a target number of bits budgeted for a GoP in the second encoding pass, and a QP in the second encoding pass; and a second encoding module configured to encode the input video sequence using the target coding parameters for the second encoding pass and to output a second encoding pass encoded stream as the encoded output stream.

11. The two-pass encoder of claim 10, wherein the rate control module is configured to determine the QP in the second encoding pass for the picture i for each MB within the picture i so that an actual number of bits consumed for the picture i is approximately equal to $R_{two,Ff,picType}(i)$.

12. A two-pass encoder to encode an input video sequence, the two-pass encoder comprising:

a processor having an input for receiving an input video sequence, and an output for providing an encoded output stream; and a memory storing code that is provided to the processor to cause the processor to perform functions forming a series of modules to process the input video sequence to form the encoded output stream, the modules comprising:

a first encoding module including a circuit configured to perform a first encoding pass to encode the input video sequence, the first encoding module configured to collect coding statistics for the first encoding pass including:

$R_{one,Ff,picType}(i)$, wherein $R_{one,Ff,picType}(i)$ is a number of bits for each picture i in the first encoding pass, wherein i is an element of the set including I, P, $B_s$, and B picture in field or frame, $R_{GOP\_passOne}$, wherein $R_{GOP\_passOne}$ is a number of bits for a GoP in the first encoding pass, and $Q_{one,Ff,picType}(i)$, wherein $Q_{one,Ff,picType}(i)$ is an average QP for each picture i in the first encoding pass;

a rate control module configured to calculate target coding parameters for a second encoding pass based on coding statistics for the first encoding pass, the target coding parameters including:

$R_{two,Ff,picType}(i)$, wherein $R_{two,Ff,picType}(i)$ is a target number of bits for each picture i in the second encoding pass, and is calculated as, $$R_{two,Ff,picType}(i) = R_{one,Ff,picType}(i) \times \frac{R_{GOP\_passTwo}}{R_{GOP\_passOne}}$$

$R_{GOP\_passTwo}$, wherein $R_{GOP\_passTwo}$ is a target number of bits budgeted for a GoP in the second encoding pass, and a QP in the second encoding pass; and a second encoding module configured to encode the input video sequence using the target coding parameters for the second encoding pass and to output a second encoding pass encoded stream as the encoded output stream.

13. A two-pass encoder to encode an input video sequence, the two-pass encoder comprising:

a processor having an input for receiving an input video sequence, and an output for providing an encoded output stream; and a memory storing code that is provided to the processor to cause the processor to perform functions forming a series of modules to process the input video sequence to form the encoded output stream, the modules comprising:

a first encoding module including a circuit configured to perform a first encoding pass to encode the input video sequence, the first encoding module configured to collect coding statistics for the first encoding pass including:

$R_{one,Ff,picType}(i)$, wherein $R_{one,Ff,picType}(i)$ is a number of bits for each picture i in the first encoding pass, wherein i is an element of the set including I, P, $B_s$, and B picture in field or frame, $R_{GOP\_passOne}$, wherein $R_{GOP\_passOne}$ is a number of bits for a GoP in the first encoding pass, and $Q_{one,Ff,picType}(i)$, wherein $Q_{one,Ff,picType}(i)$ is an average QP for each picture i in the first encoding pass;

a rate control module configured to calculate target coding parameters for a second encoding pass based on coding statistics for the first encoding pass, the target coding parameters including:

$R_{two,Ff,picType}(i)$, wherein $R_{two,Ff,picType}(i)$ is a target number of bits for each picture i in the second encoding pass, $R_{GOP\_passTwo}$, wherein $R_{GOP\_passTwo}$ is a target number of bits budgeted for a GoP in the second encoding pass, and a QP in the second encoding pass; and a second encoding module configured to encode the input video sequence using the target coding parameters for the second encoding pass and to output a second encoding pass encoded stream as the encoded output stream, wherein, the QP value for the picture i in the second encoding pass is calculated as, $$Q_{two,Ff,picType}(i) = Q_{one,Ff,picType}(i) + 6 \times \log_2\left(\frac{R_{one,Ff,picType}(i)}{R_{two,Ff,picType}(i)}\right).$$

14. A non-transient computer readable storage device storing at least one computer program that when executed by a computer system performs a method comprising:

receiving an input video sequence, wherein the input video sequence includes a sequence of pictures, i, and each picture i is an I, P, $B_s$, or B picture in field or frame;

performing a first encoding pass to encode the input video sequence;

collecting coding statistics for the first encoding pass including:

$R_{one,Ff,picType}(i)$, wherein $R_{one,Ff,picType}(i)$ is a number of bits for each picture i in the first encoding pass, $R_{GOP\_passOne}$, wherein $R_{GOP\_passOne}$ is a number of bits for a GoP in the first encoding pass, and $Q_{one,Ff,picType}(i)$, wherein $Q_{one,Ff,picType}(i)$ is an average quantization parameter (QP) for each picture i in the first encoding pass;

calculating target coding parameters for a second encoding pass based on the coding statistics for the first encoding pass, the target coding parameters including:

$R_{two,Ff,picType}(i)$, wherein $R_{two,Ff,picType}(i)$ is a target number of bits for each picture i in the second encoding pass, and is calculated as:

$$R_{two,Ff,picType}(i) = R_{one,Ff,picType}(i) \times \frac{R_{GOP\_passTwo}}{R_{GOP\_passOne}}$$

$R_{GOP\_passTwo}$, wherein $R_{GOP\_passTwo}$ is a target number of bits budgeted for a GoP in the second encoding pass, and a QP for each picture i in the second encoding pass; and performing the second encoding pass on the input video sequence at a constant bit rate (CBR) using the target coding parameters to form a second pass encoded stream.

15. The non-transient computer readable storage device of claim 14, wherein the QP in the second encoding pass for the picture i is a QP for each MB within the picture i, and the QP for each MB in the second encoding pass is determined so an actual number of bits consumed for the picture i is approximately equal to $R_{two,Ff,picType}(i)$.

16. The non-transient computer readable storage device of claim 14, further comprising:

updating the target bit budget for the GOP in the second encoding pass.

* * * * *